US007292942B2

(12) United States Patent
Ellis et al.

(10) Patent No.: US 7,292,942 B2
(45) Date of Patent: Nov. 6, 2007

(54) MEASURING FORMATION DENSITY THROUGH CASING

(75) Inventors: Darwin V. Ellis, Ridgefield, CT (US); Marvin E. Markley, New Orleans, LA (US)

(73) Assignee: Schlumberger Technology Corporation, Ridgefield, CT (US)

( * ) Notice: Subject to any disclaimer, the term of this patent is extended or adjusted under 35 U.S.C. 154(b) by 176 days.

(21) Appl. No.: 10/762,690

(22) Filed: Jan. 22, 2004

(65) Prior Publication Data

US 2004/0210393 A1    Oct. 21, 2004

Related U.S. Application Data

(60) Provisional application No. 60/442,364, filed on Jan. 24, 2003.

(51) Int. Cl.
*G06F 15/52* (2006.01)
*G01V 5/10* (2006.01)

(52) U.S. Cl. .................... 702/8; 250/269.5
(58) Field of Classification Search ............ 702/1–8; 250/256, 269.5
See application file for complete search history.

(56) References Cited

U.S. PATENT DOCUMENTS

| | | | |
|---|---|---|---|
| 3,521,063 A | 7/1970 | Tittman | 250/83.3 |
| 3,864,569 A | 2/1975 | Tittman | 250/264 |
| 4,048,495 A | 9/1977 | Ellis | 250/264 |
| 4,297,575 A | 10/1981 | Smith, Jr. et al. | 250/265 |
| 5,282,133 A * | 1/1994 | Watson | 702/8 |
| 5,334,833 A * | 8/1994 | Case et al. | 250/269.1 |
| 5,350,925 A * | 9/1994 | Watson | 250/269.3 |
| 5,390,115 A | 2/1995 | Case et al. | 364/422 |
| 5,841,135 A | 11/1998 | Stoller et al. | 250/269.3 |
| 5,859,811 A | 1/1999 | Miller et al. | 367/35 |
| 5,900,627 A * | 5/1999 | Odom et al. | 250/269.7 |
| 6,483,777 B1 | 11/2002 | Zeroug | 367/35 |
| 6,768,106 B2 * | 7/2004 | Gzara et al. | 250/269.3 |
| 6,936,812 B2 * | 8/2005 | Odom et al. | 250/269.5 |
| 2004/0210393 A1 * | 10/2004 | Ellis et al. | 702/8 |

OTHER PUBLICATIONS

Cigna, Michele and Magrassi, Mara, *Gas Detection from Formation Density and Compensated Neutron Log in Cased Hole*. SPWLA 28th Annual Logging Symposium (Jun. 29-Jul. 2, 1987).
Cosentino, L. and Spottl, G. *Reevaluation of Hydrocarbon Reserves in Old Fields Through Cased-Hole Interpretation*: A New Approach. SPE 22345 (1992) pp. 167-175.

(Continued)

*Primary Examiner*—John Barlow
*Assistant Examiner*—Victor J. Taylor
(74) *Attorney, Agent, or Firm*—Jody Lynn DeStefanis; Vincent Loccisano

(57) ABSTRACT

A method of determining formation density in a cased hole environment using a logging tool having a gamma ray source, a long spacing detector, and a short spacing detector that includes developing one or more cased hole calibration relationships that utilize differences between scattered gamma rays observed by short spacing detectors and scattered gamma rays observed by long spacing detectors to determine corrected formation density values, and using the cased hole calibration relationships and scattered gamma ray measurements obtained by the long spacing detector and the short spacing detector to determine the formation density. An associated article of manufacture and computerized well logging system are also described.

19 Claims, 3 Drawing Sheets

OTHER PUBLICATIONS

Ellis, Darwin V. *Well Logging for Earth Scientists*. Elsevier Science Publishing Co., Inc. (1987) pp. 201-212.

Jacobson, Larry A. and Fu, Chu-Chlu. *Computer Simulation of Cased-Hole Density Logging*. SPE 19613 (Dec. 1990) pp. 465-468.

Moake, G. L. *Design of a Cased-Hole-Density Logging Tool Using Laboratory Measurements*. SPE 49226 (1998) pp. 565-580.

Quint, Edwin. *Monitoring Contact Movement During Depressurization of the Brent Field*. SPE 56951 (1999).

* cited by examiner

MEASURING FORMATION DENSITY THROUGH CASING

RELATED APPLICATION

This application claims the benefit of U.S. Provisional Application No. 60/442,364, filed Jan. 24, 2003.

FIELD OF THE INVENTION

The present invention relates to a method of determining the density of a subsurface formation and, more particularly, to a method of determining the density of a subsurface formation through casing.

BACKGROUND OF THE INVENTION

The use of gamma ray scattering measurements to measure the density of subsurface formations is well known. A general introduction to this topic can be found in *Well Logging for Earth Scientists*, by Darwin V. Ellis, Elsevier Science Publishing Co., Inc., 1987, pgs. 201-212, incorporated herein by reference. Gamma ray density measurement logging tools were initially developed for open hole applications and the earliest single detector tools were soon replaced by dual detector tools that allow compensations to be made for the possible intervening presence of mudcake or drilling fluid between the tool and the formation.

While originally developed for open hole logging purposes, it has long been known that these types of gamma ray density tools could also be used to obtain density measurements through casing. See, for instance, U.S. Pat. No. 4,297,575, issued Oct. 27, 1981; "Gas Detection from Formation Density and Compensated Neutron Log in Cased Hole", M. Cigni and M. Magrassi, SPWLA 28$^{th}$ Annual Logging Symposium, 1987; "Reevaluation of Hydrocarbon Reserves Through Case-Hole Interpretation: A New Approach", L. Cosentino and G. Spotti, SPE 22345, 1992; and "Monitoring Contact Movement during Depressurization of the Brent Field", E. Quint, SPE 56951, 1999, each of which is incorporated herein by reference. While conventional open hole gamma ray density tools have occasionally been used to make formation density-related measurements in cased wells, this technique has not become widely used because the relatively weak gamma ray sources (typically a Cesium-137 source emitting gamma rays at 662 keV) and relatively short source/receiver spacings used in conventional open hole gamma ray density tools results in a relatively shallow depth of investigation, often insufficiently deep to make accurate formation density measurements through casing. In addition, the use of conventional open hole gamma ray density measurement data processing methodologies have not sufficiently accounted for the many types of differing conditions encountered while making measurements through casing, such as variations in apparent casing thickness due to corrosion, casing collars, centralizers, etc.; variations in the thickness of the cement between the casing and the formation; the presence of water, drilling mud, or gas filled voids in the cement layer; etc.

There has recently been work done on the development of a gamma ray density tool specifically designed by operate in a cased-hole environment. See for instance, "Computer Simulation of Cased-Hole Density Logging", L. Jacobsen and C. Fu, SPE 19613, December 1990; and "Design of a Cased-Hole-Density Logging Tool Using Laboratory Measurements", G. Moake, SPE 49226, 1998, both incorporated herein by reference. These proposals have primarily focused on the use of a more energetic gamma ray source (such as Cobalt-60) and larger source/receiver spacings to increase the depth of investigation. Although the need for a gamma ray density behind casing measurement is not seriously in doubt, the tool proposed in these papers (or any other tool specifically designed to make gamma ray density measurements behind casing) has never been commercially successful.

Schlumberger, assignee of the present invention, has long been a leader in the measurement of formation density using gamma ray scattering behavior. Early gamma ray density measurement tools are described in commonly-assigned U.S. Pat. No. 3,864,569 to J. Tittman, issued Feb. 4, 1975 and U.S. Pat. No. 4,048,495 to D. Ellis, issued Sep. 13, 1977. Commonly-assigned U.S. Pat. No. 5,390,115 to C. Case and D. Ellis, issued Feb. 14, 1995 and U.S. Pat. No. 5,841,135, to C. Stoller et al., issued Nov. 24, 1998, describe three detector gamma ray density logging tools designed for open hole use that have enhanced abilities to correct for standoff between the tool and the formation. Each of these earlier, commonly assigned patents are incorporated herein by reference.

Schlumberger has successfully introduced a three detector gamma ray density logging tool called the TLD* (* Mark of Schlumberger) as part of the Platform Express* triple combo tool. The TLD* tool has a Cesium-137 source and three detectors, a backscattering detector located less than two inches (5 centimeters) from the source, a short spacing detector located approximately 6-8 inches (15-20 centimeters) from the source, and a long spacing detector located approximately 14-18 inches (36-46 centimeters) from the source. The diameter of the TLD* tool when closed is approximately 4¾ inches (12 centimeters).

SUMMARY OF THE INVENTION

While specifically designed for open hole applications, Applicants have discovered that the addition of the short spacing detector between the backscatter detector and the long spacing detector allows measurements obtained from such a three detector tool to be used to make reasonably accurate formation density measurements behind casing when processed in accordance with the methodology described below.

Accordingly, it is an object of the present invention to provide an improved method of measuring formation density behind casing using gamma ray scattering measurements.

One aspect of this invention involves an improved method of measuring formation density through casing including utilizing differences between the scattered gamma rays observed by the short spacing detector and the long spacing detector to derive the formation density. Other aspects of the invention include an associated article of manufacture and computerized well logging system. Further features and applications of the present invention will be apparent from the figures and detailed description that follows.

DETAILED DESCRIPTION

Figure 1:
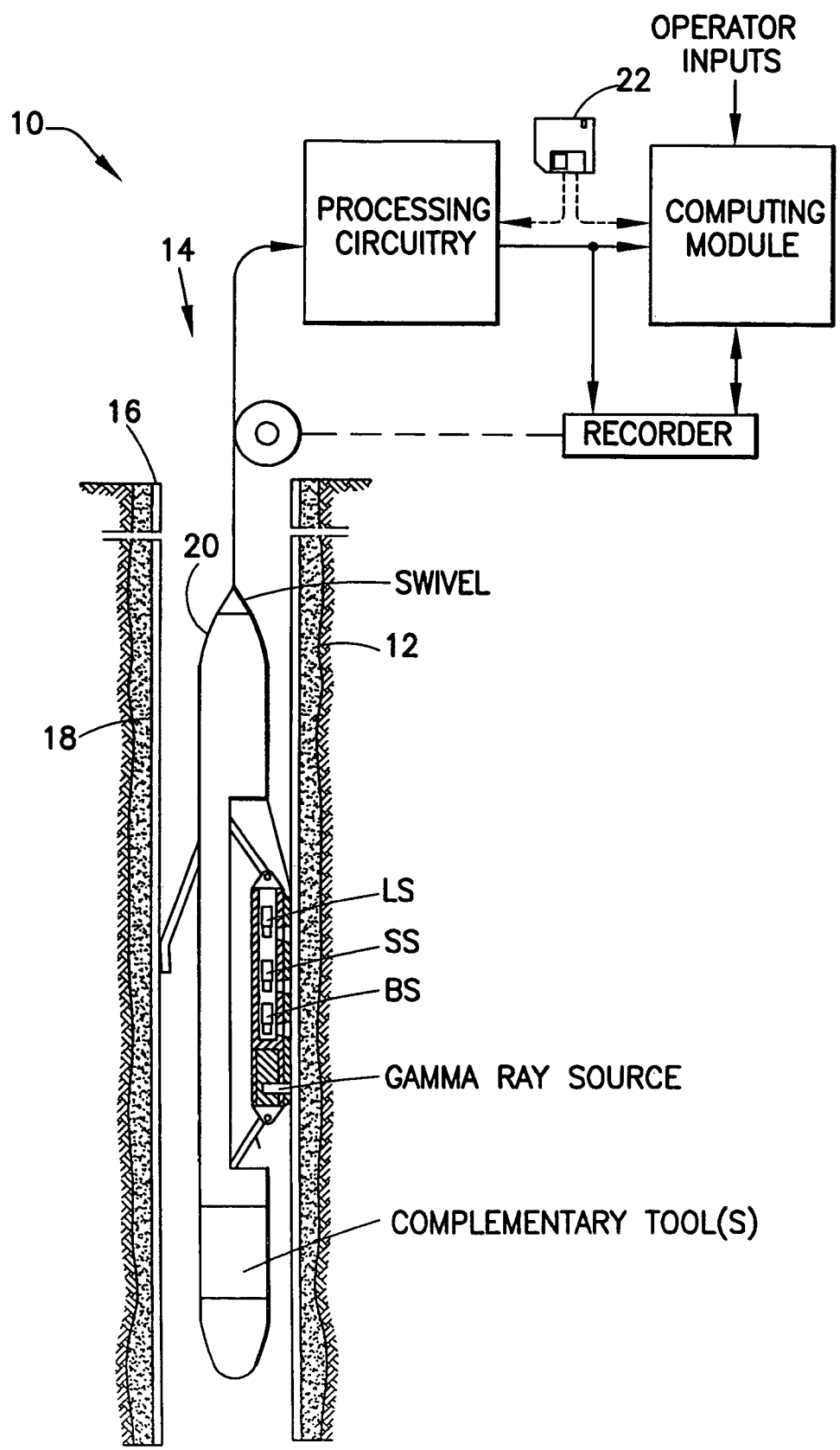
FIG. 1 is a schematic illustration of wireline logging tools being used to acquire gammy ray scattering and other measurements from a subsurface area.

An example wireline data acquisition and processing system 10 is shown deployed within a subsurface formation 12. A borehole 14 has been drilled within the subsurface formation 12, casing 16 has been placed within the borehole, and cement 18 has been forced into the annulus between the borehole and the casing. Logging tools 20 are suspended in the borehole 14 on a cable, the deployed length of which substantially determines the depth of the logging tools within the subsurface formation 12. A swivel is provided to allow the logging tools 20 to rotate with respect to the cable, as discussed in more detail below. The cable length is controlled by conventional means at the surface (not shown). Conventional means are used to monitor the depth of tools 20 within the formation 12 and to process, compute, and record the measurements made by sensors within the tool. An article of manufacture, such as floppy disk 22, or another type of optical, magnetic, or electronic media may be used to provide computer-readable program means to the computing module and/or processing circuitry.

The inventors have discovered that by appropriately calibrating the response of the short spacing detector (SS) and the long spacing detector (LS), a reasonably accurate estimate of the density of the formation 12 may be made in a cased hole environment.

A first method for calibrating these responses involves making a series of measurements of the short spacing and long spacing detector responses in various casing thicknesses, cement thicknesses, and cement densities. These measurements may be made, for instance, using a variety of different laboratory setups. It is then possible to derive one or more correction relationships that utilize differences between scattered gamma rays observed by the short spacing detector and scattered gamma rays observed by the long spacing detector to determine the formation density. In one embodiment, this involves the development of calibration curves, of the type shown in FIG. 10-8 of *Well Logging for Earth Scientists*, that allows an estimate of the formation density derived solely from the long spacing detector to be corrected based on the difference between the density derived solely from the long spacing detector and the density derived solely from the short spacing detector. It will be understood by those skilled in the art that these types of calibration relationships may be expressed in many different formats, such as curves, lookup tables, equations, etc.

Since the photoelectric absorption of gamma rays by the steel casing is minimized as the energy of the window of the detector increases, it is possible to select a counting rate that is more sensitive to formation density and less sensitive to the thickness of the casing by using the detectors' highest energy windows. Of course, the spectrum intensity decreases as the energy increases, so there is a trade-off between decreasing the sensitivity to photoelectric absorption and maintaining a decent counting rate so the counting rates in logging situations will be statistically valuable without severe reductions in logging speeds.

Figure 2:
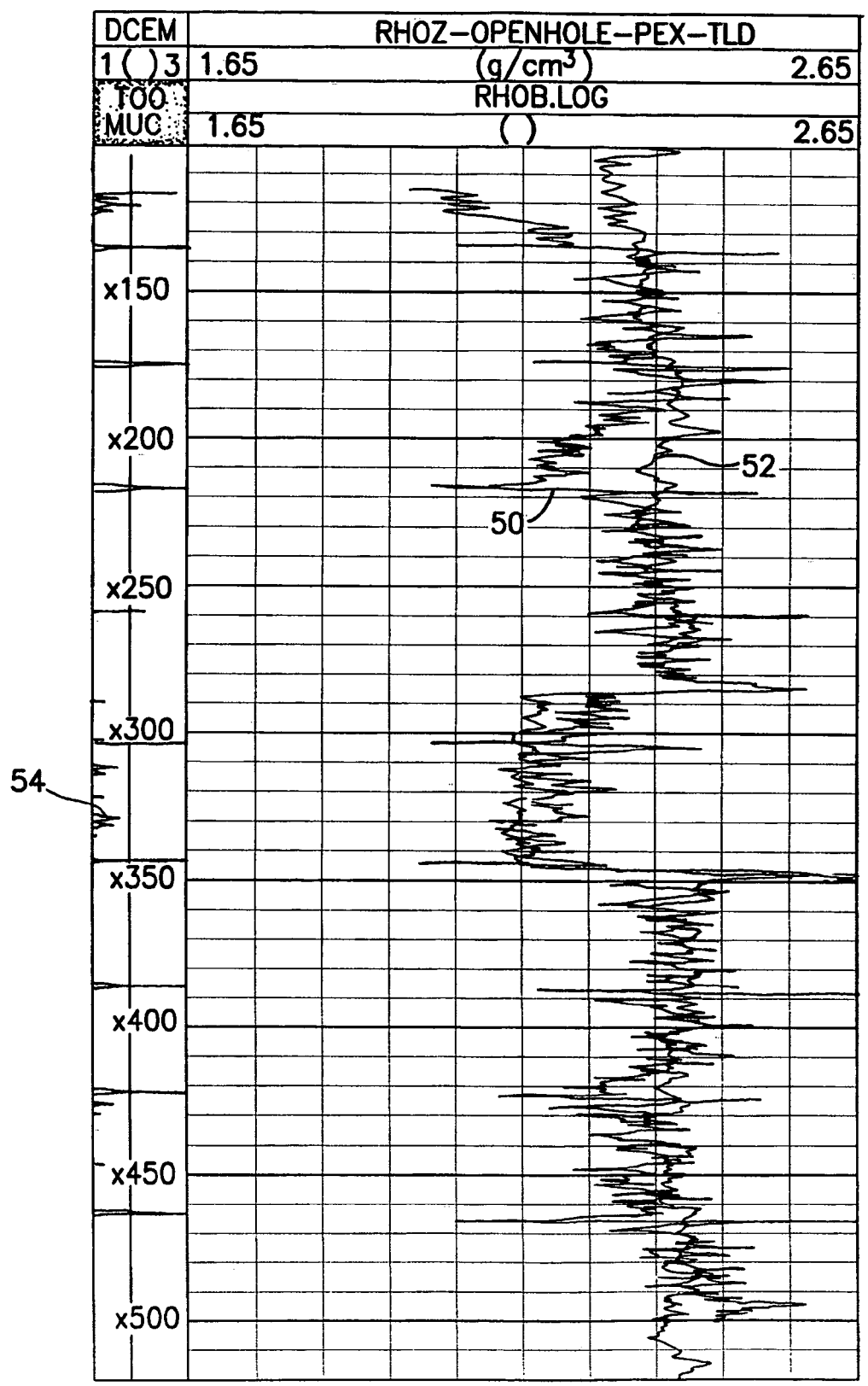
FIG. 2 is a well log comparing formation density measurement results from a TLD* tool run before the well was cased and after the well was cased, with the cased hole measurements processed in accordance with a first embodiment of the inventive method.

FIG. 2 shows a well log that compares formation density measurement results from a TLD* tool run in a well in the Gulf of Mexico before the well was cased (Open Hole Log 50) and the results of processing the short spacing and long spacing detector measurements using calibration curves derived in accordance with the method described above (First Cased Hole Log 52).

It is well known that the TLD* tool has a limited depth of investigation. The inventors have determined that the maximum thickness of steel and cement that the TLD* tool is capable of determining the formation density through is approximately 1.75 or 1.85 inches and it is important to flag when the apparent standoff between the tool and the formation exceeds this distance. One method for estimating the cement thickness in inches is to multiply the difference between the best estimate of the formation density and the estimate of the formation density derived solely from the long spacing detector by four (4) and then dividing this product by the difference between the best estimate of the formation density and an estimate of the cement or annulus density. Reasonable cement densities range from 1.6 to 1.9 g/cm$^3$. A cut off of 1.85 inches for this calculated cement thickness can be established as a value near the limit of the depth of investigation for this tool. This calculated cement thickness is shown in FIG. 2 as Calculated Cement Thickness Log 54 (only the values exceeding 1 inch and less than 3 inches are displayed).

An alternative method for using the measurements obtained from the short spacing and long spacing detectors to determine formation density involves first removing perturbations in the backscatter (BS), short spacing (SS), and long spacing (LS) detector measurements associated with casing collars, centralizers, and other types of readily recognizable completion hardware. A dramatic drop in count rates in the high energy windows for the short- and long-spacing detectors (typically by a factor of about three) can be used, for instance, to determine where the steel is too thick to permit cased hole formation density measurements to be made using the TLD* tool. A conventional method for removing these types of perturbations is to replace those samples that are obviously influenced by the presence of these types of completion components with substitute samples that average the values of the closest good samples on either side of the perturbed samples. These high resolution samples (typically samples are obtained every one inch) can then be averaged and decimated to a six inch sampling interval. The corrected and uncorrected cased hole formation densities may be output to permit interpreters to judge for themselves the validity of the correction that has been made.

Different correction curves may be derived for different casing thicknesses, different cement thicknesses, and/or different cement densities. Casing thicknesses may be back calculated from the planned casing weight, typically expressed in pounds per foot. Cement thicknesses may be estimated by assuming the casing is centered and taking one half of the difference between the nominal borehole diameter (typically derived from the size of the largest drill bit passing through that portion of the borehole or from an open hole caliper log) and the outer diameter of the casing. Cement densities may be assumed to be the density of the cement pumped at the surface. Applicants have discovered that coefficients derived using common casing thicknesses, cement thicknesses, and cement densities appear to provide reasonable results under many different subsurface conditions.

The casing thickness can be estimated by comparing the count rates from low energy and high energy windows of the backscatter detector. Due to the different types of nuclear interactions between the source gamma rays and the steel casing and cement layer, the ratio of the count rate of the highest energy window of the backscatter detector to the count rate of the lowest energy window of the backscatter detector appears to provide a reasonably reliable estimate of the casing thickness.

This casing thickness can be utilized with the long spacing detector count rates (or perhaps only count rates from one or more long spacing detector higher-energy windows) to provide a solely-long spacing detector based estimate of the formation density. Similarly the casing thickness can be utilized with the short spacing detector count rates (or perhaps only count rates from one or more short spacing detector higher-energy windows) to provide a solely-short spacing detector based estimate of the formation density. Calibration relationships, such as the calibration curves of the type shown in FIG. 10-8 of *Well Logging for Earth Scientists* but derived from experimental data, as mentioned earlier, may then be used to estimate the correction to be added to the long spacing detector based estimate of the formation density to provide the final measurement of the formation density.

Figure 3:
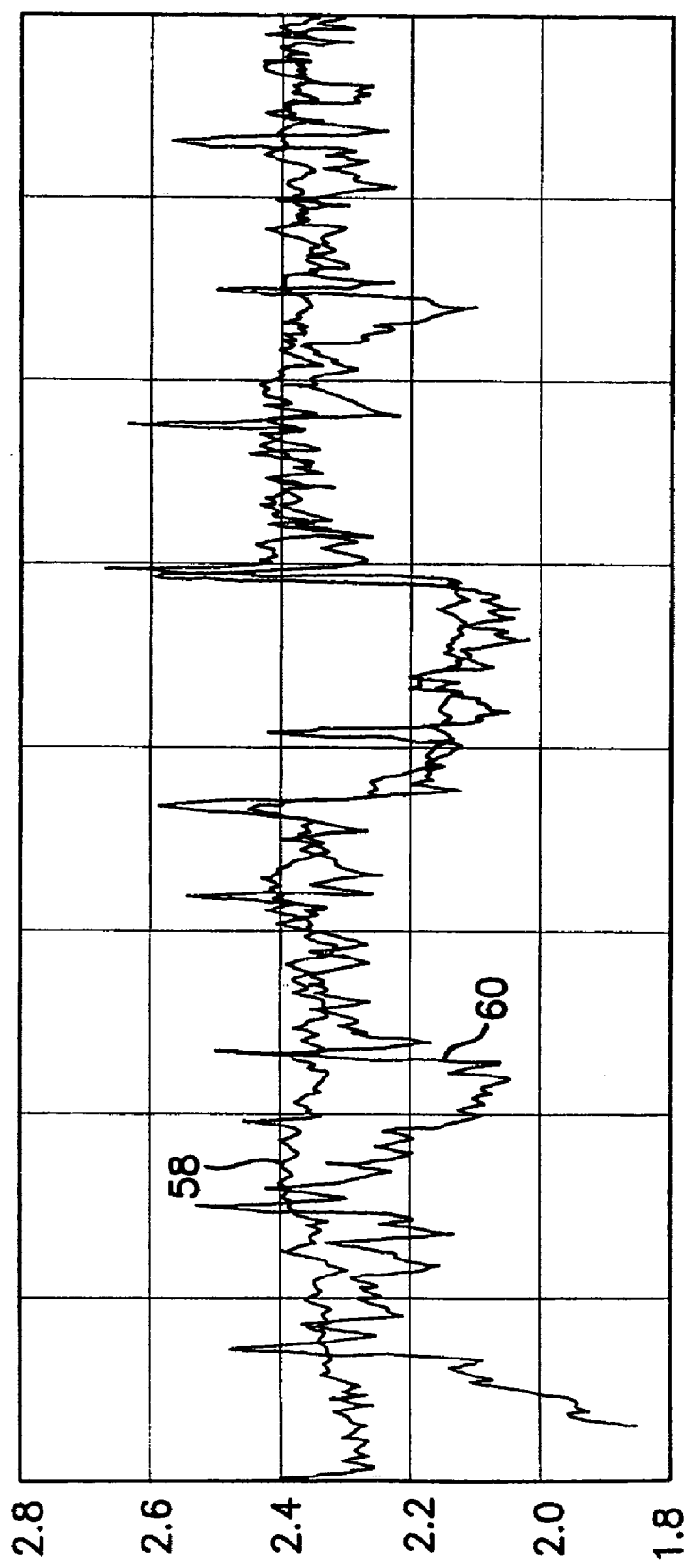
FIG. 3 is a well log comparing formation density measurement results from a TLD* tool run before the well was cased and after the well was cased, with the cased hole measurements processed in accordance with a second embodiment of the inventive method.

FIG. 3 shows a well log that compares formation density measurement results from a TLD tool run in a well in the Gulf of Mexico before the well was cased (Open Hole Log 58) and the results of processing the short spacing and long spacing detector measurements in accordance with this alternative method (Second Cased Hole Log 60).

The casing thickness can alternatively be estimated from the casing weight, as described above, or a complementary tool may be used to determine the casing thickness. Examples of tools that provide reliable estimates of casing thickness include Schlumberger's UCI* and USI* tools, which are based on ultrasonic measurements.

Because the depth of investigation of this gamma ray scattering measurement is relatively shallow, it is preferable to run the Platform Express* TLD* tool with a complementary tool having a deeper depth of investigation and the ability to determine the standoff between the tool and the formation using a different type of measurement physics. Schlumberger's APS* tool, for instance uses a neutron source to measure epithermal porosity, but the tool can also provide a reliable estimate of the standoff between the tool and formation. Alternatively Schlumberger's USI* tool may be used with bin processing as described in U.S. Pat. No. 5,859,811, entitled "Method of Analyzing Waveforms" and issued Jan. 12, 1999 to D. Miller and F. Stanke, incorporated herein by reference, to measure the cement thickness.

A tool of the type described in commonly-assigned U.S. Pat. No. 6,483,777, issued Nov. 19, 2002, and entitled "Method and Apparatus for Ultrasonic Imaging of a Cased Well", incorporated herein by reference, when used with a UCI* type of device would be able to determine not only the thickness of the cement layer between the casing and the formation, but also the density of this cement layer. Appropriately utilizing this type of information derived from such a complimentary tool can allow regions where the standoff between the tool and the formation exceeds the depth of investigation to be flagged and would allow a more accurate estimate of the formation density to be made using the short spacing detector and long spacing detector count rates. Utilizing a tool or tools with deeper depths of investigation also provides an interpreter with independent data sets that can be used to evaluate the validity of the cased hole formation-density measurements.

When the well is deviated, the casing will typically be eccentered, lying closer to the low side of the borehole. On this side, the casing plus cement thickness will be the smallest, therefore this side is the preferred side for cased hole formation-density logging. To ensure that the tool's pad face is always oriented downward, the use of a swivel head, as shown in FIG. 1, is recommended.

In addition to the formation density, one or more log quality control logs may be output, such as apparent casing thickness, apparent cement thickness, logging speed, detector count rate, etc.

While the inventive method is described in connection with Schlumberger's TLD* tool, it will be understood that any gamma ray scattering tool having a short spacing detector located approximately 5 to 12 inches (13-30 centimeters) from the source and a long spacing detector located approximately 13 to 24 inches (33-61 centimeters) from the source could alternatively be used. It will also be understood by those skilled in the art that other gamma ray sources than Cesium-137 may be used, such as a Cobalt-80 source, a betatron device, etc.

The TLD* tool has been designed to be run at a logging speed of 3600 ft/hr (30 cm/s) in an open-hole environment. The count rate will be substantially reduced in a cased-hole environment because the steel casing will absorb a considerable fraction of the gamma rays before they enter the formation or as they return to the tool. To compensate for this, it is preferable to run the TLD* tool at a logging speed that is at least 2, 3, or preferably 4 times slower than the corresponding recommended open-hole logging speed (1800 ft/hr (15 cm/s), 1200 ft/hr (10 cm/s), or 900 ft/hr (7.5 cm/s), respectively).

Computer instructions allowing the computing module and/or processing circuitry (which may be located within logging tool 20 or at the surface as shown in FIG. 1) to determine the formation density using the long spacing and short spacing detector responses can be recorded onto an article of manufacture, such as floppy disk 22, and this article of manufacture can be used to transfer the software onto the computing module and/or processing circuitry.

While the invention has been described herein with reference to certain examples and embodiments, it will be evident that various modifications and changes may be made to the embodiments described above without departing from the scope of the invention as set forth in the claims below.

We claim:

1. A method of determining formation density in a cased hole environment using a logging tool having a gamma ray source, a long spacing detector, and a short spacing detector, comprising:
   developing one or more cased hole calibration relationships that utilize differences between scattered gamma rays observed by short spacing detectors and scattered gamma rays observed by long spacing detectors to determine corrected formation density values;
   using said cased hole calibration relationships and scattered gamma ray measurements obtained by said long spacing detector and said short spacing detector to determine the formation density; and
   storing the determined formation density on a computer-readable medium.

2. A method according to claim 1, wherein said long spacing detector is located between 13 inches and 24 inches from said gamma ray source.

3. A method according to claim 2, wherein said long spacing detector is located between 14 inches and 18 inches from said gamma ray source.

4. A method according to claim 1, wherein said short spacing detector is located between 5 inches and 12 inches from said gamma ray source.

5. A method according to claim 4, wherein said short spacing detector is located between 6 inches and 8 inches from said gamma ray source.

6. A method according to claim 1, wherein said logging tool further includes a backscatter detector located between said gamma ray source and said short spacing detector.

7. A method according to claim 1, wherein said gamma ray source comprises a Cesium-137 source.

8. A method according to claim 1, wherein different said calibration relationships are determined for different casing thicknesses and casing thickness is determined by one or more of: back calculated from planned casing weight; comparing count rates from low energy and high energy windows of a third detector positioned between said gamma ray source and said short spacing detector; and ultrasonic measurements.

9. A method according to claim 1, wherein different said calibration relationships are determined for different cement thicknesses and cement thickness is determined by one or more of: taking one half of the difference between the nominal borehole diameter and the outer diameter of the casing; multiplying the difference between the best estimate of the formation density and the estimate of the formation density derived solely from the long spacing detector by a constant and then dividing this product by the difference between the best estimate of the formation density and an estimate of the cement or annulus density; neutron measurements; and ultrasonic measurements.

10. A method according to claim 1, wherein different said calibration relationships are determined for different cement densities and cement density is determined by one or more of: utilizing the density of the cement pumped at the surface and ultrasonic measurements.

11. A method according to claim 1, wherein said scattered gamma ray measurements obtained by said long spacing detector and said short spacing detector are corrected for perturbations associated with completion hardware.

12. A method according to claim 11, wherein said correction is performed by identifying a region associated with said completion hardware and substituting for perturbed samples in this region an average of the values of closest good samples on either side of these perturbed samples.

13. A method according to claim 1, where said short spacing detector and said long spacing detector each have multiple energy windows and count rates from lower energy windows associated with said detectors are ignored or underweighted with respect to higher energy windows associated with said detectors.

14. A method according to claim 1, further comprising determining a maximum standoff distance been said logging tool and the formation.

15. A method according to claim 14, further comprising determining when the standoff distance between said logging tool and the formation exceeds said maximum standoff distance.

16. An article of manufacture, comprising:
a computer useable medium having a computer readable program code means embodied therein for determining formation density in a cased hole environment, the computer readable program code means in said article of manufacture comprising:
computer readable program means for determining formation density in a cased hole environment and storing the determined formation density on a computer-readable medium, the program means using one or more cased hole calibration relationships and measurements made by a logging tool having a gamma ray source, a backscatter detector, a long spacing detector, and a short spacing detector, where the backscatter detector is disposed between the gamma ray source and the short spacing detector.

17. A computerized well logging system for determining formation density in a cased hole environment, comprising:
a logging tool having a gamma ray source, a backscatter detector, a long spacing detector, and a short spacing detector, the backscatter detector disposed between the gamma ray source and the short spacing detector;
a computing module and/or processing circuitry, connected to said logging tool, having means for calculating formation density from gamma ray scattering measurements obtained by said long spacing detector and gamma ray scattering measurements obtained by said short spacing detector using one or more cased hole calibration relationships, and means for storing the determined formation density on a computer-readable medium.

18. A computerized well logging system according to claim 17 wherein said logging tool is suspended by a cable and a swivel allows said logging tool to rotate with respect to said cable.

19. A computerized well logging system according to claim 17, wherein said logging tool has a recommended open hole logging speed and a recommended cased hole logging speed and said recommended cased hole logging speed is at least two times slower than said recommended open hole logging speed.

* * * * *